United States Patent [19]

Filippi

[11] Patent Number: 4,645,600
[45] Date of Patent: Feb. 24, 1987

[54] IN-TANK FUEL FILTER

[76] Inventor: Joseph J. Filippi, 501 B Lynn Ave., Vineland, N.J. 08360

[21] Appl. No.: 720,352

[22] Filed: Apr. 5, 1985

[51] Int. Cl.⁴ ............................................. B01D 27/08
[52] U.S. Cl. .................................. 210/416.4; 210/442; 210/457; 210/460; 210/484; 210/485
[58] Field of Search .................. 210/416.4, 416.5, 167, 210/168, 172, 296, 299, 308, 309, DIG. 5, 435, 437, 441, 442, 457, 459, 460, 461–463, 484, 485

[56] References Cited

U.S. PATENT DOCUMENTS

| | | | |
|---|---|---|---|
| 2,503,566 | 4/1950 | Scott | 210/172 |
| 2,751,084 | 6/1956 | Wilhelm | 210/172 |
| 3,208,596 | 9/1965 | Gravert | 210/DIG. 5 |
| 3,249,438 | 5/1966 | Topol | 210/DIG. 5 |
| 4,151,087 | 4/1979 | Sakaguchi | 210/DIG. 5 |
| 4,430,222 | 2/1984 | Walker | 210/DIG. 5 |
| 4,479,875 | 10/1984 | Nelson | 210/DIG. 5 |

Primary Examiner—Frank Sever

[57] ABSTRACT

A fuel tank filter connected to and submerged in the tank at the end of the supply line that is particularly effective for outside fuel tanks including an inlet tube extending towards the bottom of the tank having a plurality of inlet holes proximate to the end of the tube, a fibrous filter surrounding the inlet tube, a cup surrounding the fibrous filter and the inlet tube preventing flow except over the top edge of the cup at the height of at least three inches from the bottom of the filter and a fine wire mesh covering the fibrous filter.

6 Claims, 5 Drawing Figures

IN-TANK FUEL FILTER

BACKGROUND OF INVENTION

This invention relates to a fuel filter positioned inside the tank containing fuel, such as for heating a building.

The typical commercially available fuel tank filter is located outside the tank and is essentially a small overflow filter to trap large particulate. The supply line extending an opening positioned above the bottom of the tank is threaded into a duplex bushing having two holes with standard ⅜ flare fittings. The supply line extends from the bushing to the small overflow filter and then to the burner. A return line provides a pressure release that extends from the burner back to the duplex bushing and opens into the interior of the tank. Particularly in above ground tanks, water condensation causes a substantial water collection at the bottom of the tank with the fuel floating on top. The height of that water can sometimes reach three to four inches inside the tank. Sooner or later, the water level will reach the opening at the bottom of the supply line and draw water into the system and into the small overflow filter. For installations at moderate climates with an outside tank, a year hardly ever goes by without at least one maintenance call to clean out the filter which is essentially removing the ice which has clogged the filter and forced shut down of the heating system. Even in buried tanks, water collects in the filter and is ultimately drawn into the burner with substantial corrosive and damaging effects. No filter systems have been offered to satisfy and alleviate these problems. Filter systems are described in U.S. Pat. Nos. 2,547,857 to W. S. Cook, 2,795,332 to R. A. Burla, 2,846,074 to A. D. Brundage, 2,946,449 to E. C. Shaw, and 3,023,905 to J. A. McDougal et al. None of the above devices satisfy the above needs nor attain the objects herein below.

SUMMARY OF THE INvENTION

It is an object of this invention to provide a winter proof filter system that will essentially eliminate the intrusion of water from the fuel tank to the burner.

It is a further object of this invention to provide a submersible filter extending essentially to the bottom of the tank but preventing the pulling of water and contaminants into the supply line to the burner.

It is a further object of the invention to provide a fuel tank filter that not only filters out dirt and particulate carried in the fuel, but also prevents the intrusion of water droplets entrained in the fuel.

It is an additional object of this invention to provide a fuel filter which may be attached to the end of the standard supply line and fitting in the distance between the standard open end of the supply line and the bottom of the tank and yet prevent water collecting at the bottom of the tank from entering the supply line.

It is a further object of this invention to provide a fuel filter that essentially prevents any freeze up of the supply line system during the coldest of weather.

It is an additional object of this invention to provide a fuel filter that draws from all directions and further draws through a substantial area of filter material avoiding clogging and providing long filter life.

The filter of this invention to be emersed in a fuel tank is connected to the end of a supply line extending toward the bottom of a fuel tank. The supply line is usually of a length to open three or four inches above the bottom of the fuel tank. The fuel filter of this invention is intended to be attached, generally threadably attached, to the end of the supply line pipe and extend essentially to the bottom of the tank. The filter includes an inlet tube connected to and extending downwardly from the supply line and communicating with the supply line. Inlet holes are positioned proximate to the bottom portion of the tube which may extend close to the bottom of the filter and thus close to the bottom of the tank. A fibrous filter, preferably in the form of a cylindrical fibrous filter surrounds the inlet tube capable of trapping and holding small particulate materials drawn in with the fuel. A cup device surrounds the lower portion of the fibrous filter and extends upwardly a distance to prevent flow directly horizontally to or from below to the inlet holes. The height of the upper lip of the cup shaped device is at a height chosen to be higher than the normal accumulation of water at the bottom of the tank and is usually in the range of about three to four inches. A wire mesh screen covers the fibrous filter exposed above the cap device. It is preferred that the finess of the mesh screen is chosen such that when the screen is coated with oil, water droplets are repelled from the screen surface due to surface tension.

DESCRIPTION OF THE PREFERRED EMBODIMENTS

Figure 1:
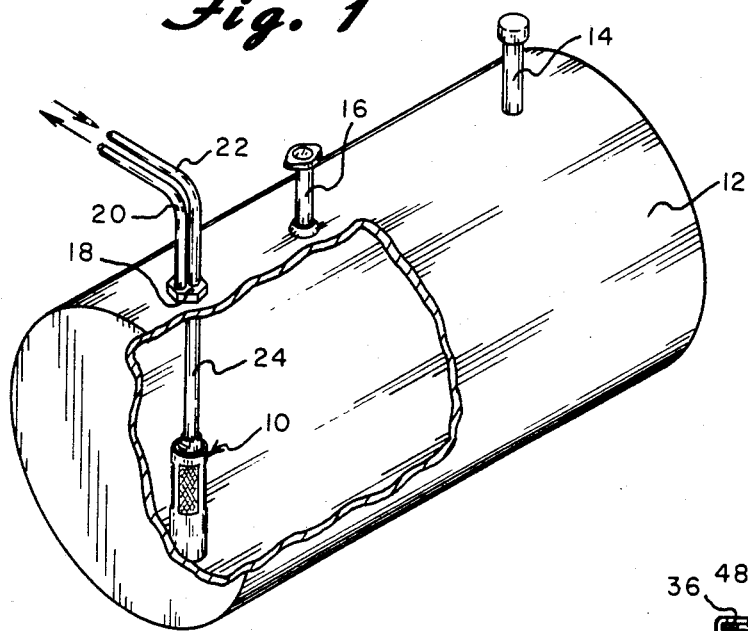
FIG. 1 is a partially cut away perspective view of a fuel tank with a filter of the present invention installed.

In FIG. 1, fuel filter 10 is installed inside tank 12 equipped with fill pipe 14, level guage pipe 16 and duplex bushing 18 to which is threaded supply line 20 and return line 22. Connected inside the tank to bushing 18 is extension supply line 24 to which fuel filter 10 is threadably attached. For installation, fuel filter 10 is threadably attached to ⅜ inch pipe line 24 which in turn is threadably attached at the upper end to bushing 18. Bushing 18 is threadably attached to tank 12 and is tightened in place after which lines 20 and 22 are connected with standard ⅜ inch flare fittings. Removal for replacement of fibrous filter insert or repair is easily accomplished by reversing the steps.

Figure 2:
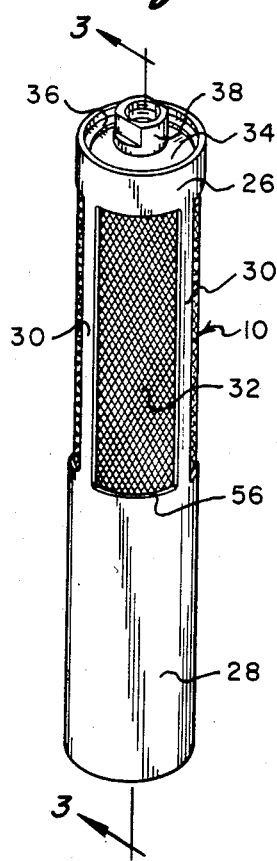
FIG. 2 is a perspective view of a fuel filter of the present invention.
Figure 3:
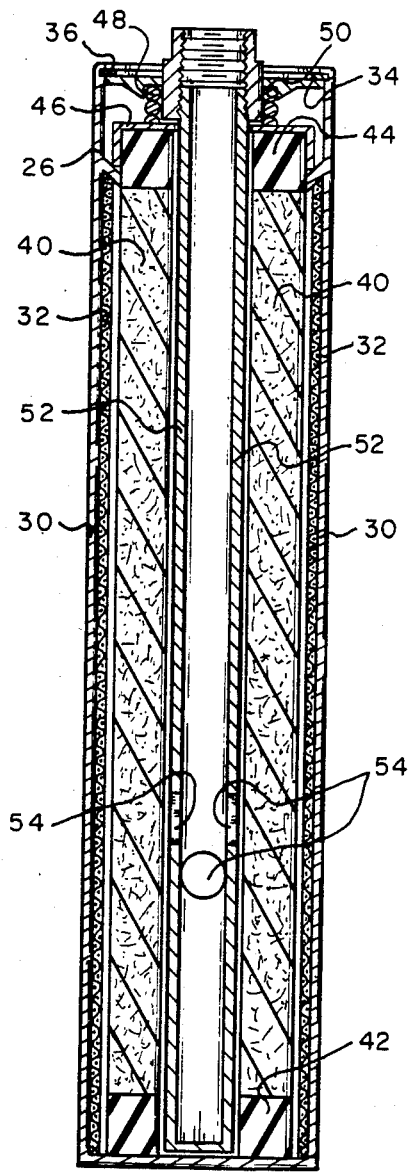
FIG. 3 is a cross-sectional view taken along lines 3—3 of FIG. 2.
Figure 4:
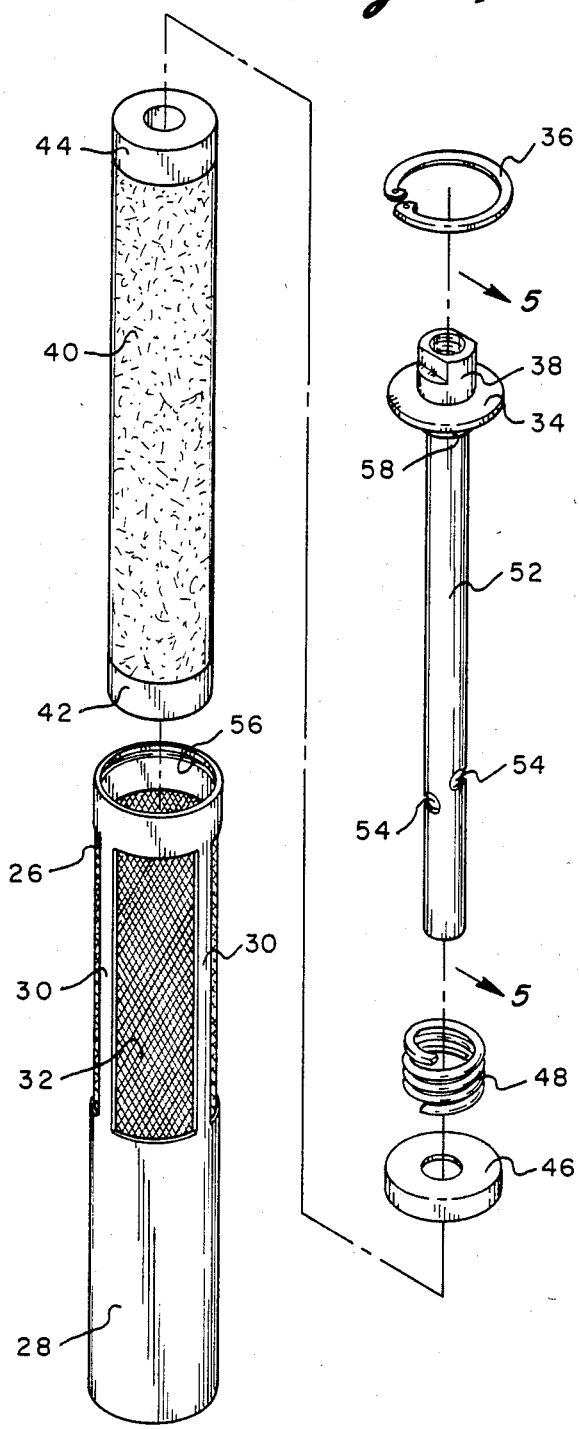
FIG. 4 is an exploded perspective view of the fuel filter illustrated in FIG. 2.
Figure 5:
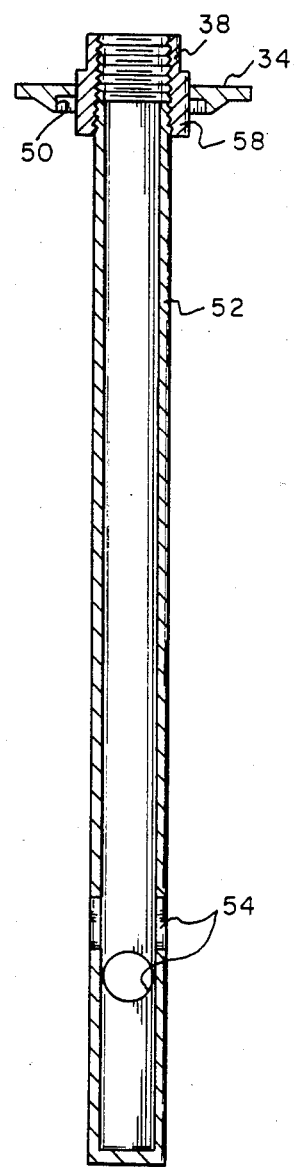
FIG. 5 is a cross-sectional view taken along lines 5—5 of FIG. 4.

As illustrated in FIG. 2, fuel filter 10 is constructed of cylindrical housing 26 which extends the length of the filter and forms solid cylindrical cup shape 28 at the bottom portion covering a substantial length of the filter typically about 3 to 4 inches. Vertical side wall members 30 support the upper section of housing 26 and hold 100 mesh stainless steel screen 32 in position. Screen 32 is a cylindrical section of screen sandwiched between housing 26 and the outside surface of an interior fibrous filter. Lid 34 is held in position by retainer sur clip 36 springably engaging a circular slot on the inside surface of the top of housing 26. Lid top tubular extension 38 is attached to lid 34, extends upwardly and is threaded inside to receive pipe line 24 and communicate directly with the interior of the filter. As further illustrated in the cross-sectional view of FIG. 3, screen 32 surrounds cylindrical fibrous filter 40 which extends essentially the entire length of the filter terminating at the bottom in donut shaped ring 42 and at the top in donut shaped ring 44 held in position vertically by inverted cylindrical cup retainer plate 46 held downwardly by spring 48 which is held in position inside spring retainer shoulder 50 on the bottom surface of lid top 34. Although not illustrated, a light porous structure provides structural strength to cylindrical filter 40 such that it is not crushed by the spring pressure in a vertical direction. Filter 40 is held horizontally between vertical side walls 30 and inlet tube 52 which is shown extending the entire length of the filter and is closed at the bottom. That extension below the holes to the bottom is preferred for structional purposes but is not critical to the operation of the filter. Inlet tube 52 may terminate and close just below inlet holes 54 which are positioned in the filter to be about three to four inches above the bottom of the tank and thus about three to four inches above the bottom of the filter. The upper edge 56 of cup shape 28 is at a height above the level of holes 54, thus requiring the oil to pass through screen 32 and then flow downwardly through fibrous filter 40 until the oil reaches holes 54 and is drawn into tube 52 and into the return line. In FIG. 4, housing 26 is shown with fibrous 40 removed and exposing slot 56 which receives clip 36. The screen is attached to the interior surface of housing 26 to interfit around fibrous filter 40. As further illustrated in FIG. 5, tube 52 is threadably connected to the bottom 58 of lid top 34 and extends downwardly to open at holes 54 opening at each of four directions radially. Spring 48 interfits and nests in side retainer spring shoulder 50 against bottom 58 of top 34. Top extension 38 is equipped with female threads 60 to receive a fitting of supply line 20.

Screen 32 may be a polymeric plastic mesh or may be stainless steel or other noncorrosive materials. A one hundred mesh screen is effective to repel water droplets. Where not noted, standard ⅜ inch flare fittings are used to connect the tubes and lines to form the fuel flow path.

While this invention has been described with reference to the specific embodiments disclosed herein, it is not confined to the details set forth and the patent is intended to include modifications and changes which may come within and extend from the following claims.

I claim:

1. An outside located field tank filter for connection to the end of a supply line toward the bottom of a fuel tank comprising: means designed for providing continuous flow of fuel from said outside located field tank to a heating system, in the coldest of weather, including,
   an inlet tube connected to and extending downwardly from the supply line and communicating with the supply line, the tube being closed at the bottom end,
   a plurality of holes through the tube above and the lower end of the filter,
   a cylindrical fiber filter surrounding the inlet tube to trap and hold small particulate materials drawn toward the inlet tube with the fuel,
   an imperforate cup extending from the bottom of the filter at least higher than the level of accumulation of water at the bottom of the tank, and surrounding the lower portion of the fibrous filter, the top of the cup and the inlet holes being relatively positioned to prevent flow directly, horizontally or from below the inlet tube, and a wire mesh screen covering the fibrous filter exposed above the cup having a mesh sized sufficient to substantially repel intrusion of water through the screen when the screen is coated with fuel.

2. The filter of claim 1 wherein the inlet tube is a solid tube closed at the end and extending proximate to the bottom of the filter with a plurality of holes through the tube at a height at least three inches above the end of the filter.

3. The filter of claim 2 wherein there are four holes extending radially through the tube at essentially the same height.

4. The filter of claim 1 wherein fibrous filter is a cylindrical fiber filter surrounding the inlet tube.

5. The filter of claim 1 wherein the cup means is a solid metal cup extending at least three inches from the bottom of the filter which is intended to rest on the bottom of the tank and the inlet holes are positioned at least one-half inch below the top edge of the cup.

6. The filter of claim 1 wherein the wire mesh is of a finess, which when coated with fuel substantially resists intrusion of water through the screen.

* * * * *